(12) United States Patent
Kikut

(10) Patent No.: US 6,398,279 B1
(45) Date of Patent: Jun. 4, 2002

(54) INTERCHANGEABLE COUPLING

(75) Inventor: Botho Kikut, Augsburg (DE)

(73) Assignee: Kuka Schweissanlagen GmbH (DE)

( * ) Notice: Subject to any disclaimer, the term of this patent is extended or adjusted under 35 U.S.C. 154(b) by 0 days.

(21) Appl. No.: 09/529,434

(22) PCT Filed: Sep. 30, 1998

(86) PCT No.: PCT/EP98/06201

§ 371 (c)(1),
(2), (4) Date: Apr. 10, 2000

(87) PCT Pub. No.: WO99/19121

PCT Pub. Date: Apr. 22, 1999

(30) Foreign Application Priority Data

Oct. 10, 1997 (DE) ...................... 297 18 726 U

(51) Int. Cl.$^7$ ............................... B25J 15/04
(52) U.S. Cl. ................... 294/86.4; 279/75; 279/905; 403/322.2; 294/82.28; 294/88; 901/30
(58) Field of Search .................. 294/1.1, 82.28, 294/86.4, 88; 279/2.23, 4.01, 75, 900, 904, 905; 403/322.2, 325, 328, 373, 374.1; 414/729, 730; 901/28–31, 37, 41, 49

(56) References Cited

U.S. PATENT DOCUMENTS

| | | | | |
|---|---|---|---|---|
| 751,345 A | * | 2/1904 | Saunders | 279/905 X |
| 1,618,851 A | * | 2/1927 | Thunberg et al. | 294/82.28 X |
| 3,795,420 A | * | 3/1974 | Preston | 294/82.28 X |
| 4,636,135 A | * | 1/1987 | Bancon | 294/82.28 X |
| 4,652,203 A | | 3/1987 | Nakashima et al. | |
| 4,723,877 A | * | 2/1988 | Erickson | 403/322.2 X |
| 4,793,053 A | * | 12/1988 | Zuccaro et al. | 294/86.4 X |
| 4,815,780 A | * | 3/1989 | Obrist | 294/86.4 |
| 4,897,014 A | | 1/1990 | Tietze | |
| 5,694,820 A | * | 12/1997 | Erickson et al. | 279/75 X |

FOREIGN PATENT DOCUMENTS

| | | |
|---|---|---|
| DE | A5 291 505 | 10/1983 |
| DE | 33 47 423 A | 7/1985 |
| EP | 0 092 967 A | 2/1983 |
| EP | 0 282 417 A | 9/1988 |
| EP | 0 548 404 A | 6/1993 |

\* cited by examiner

*Primary Examiner*—Johnny D. Cherry
(74) *Attorney, Agent, or Firm*—McGlew and Tuttle, P.C.

(57) ABSTRACT

An interchangeable coupling is provided for removably fastening tools (2) to manipulators (3). The interchangeable coupling has two coupling parts (5, 6) with a form fit lock (7). The lock has several mobile balls (8) and a piston (11) for moving the balls. The coupling parts (5, 6) have corresponding cavities (9, 10). The cavities (9) in the tool side coupling part (5) are essentially cylindrical ball channels (30) with an oblique channel axis (31). In a locked position, these cavities (9) accommodate the blocking balls (8). The channel axis (31) preferably slopes from the robot-sided cavity (10) towards the tool side (2).

18 Claims, 7 Drawing Sheets

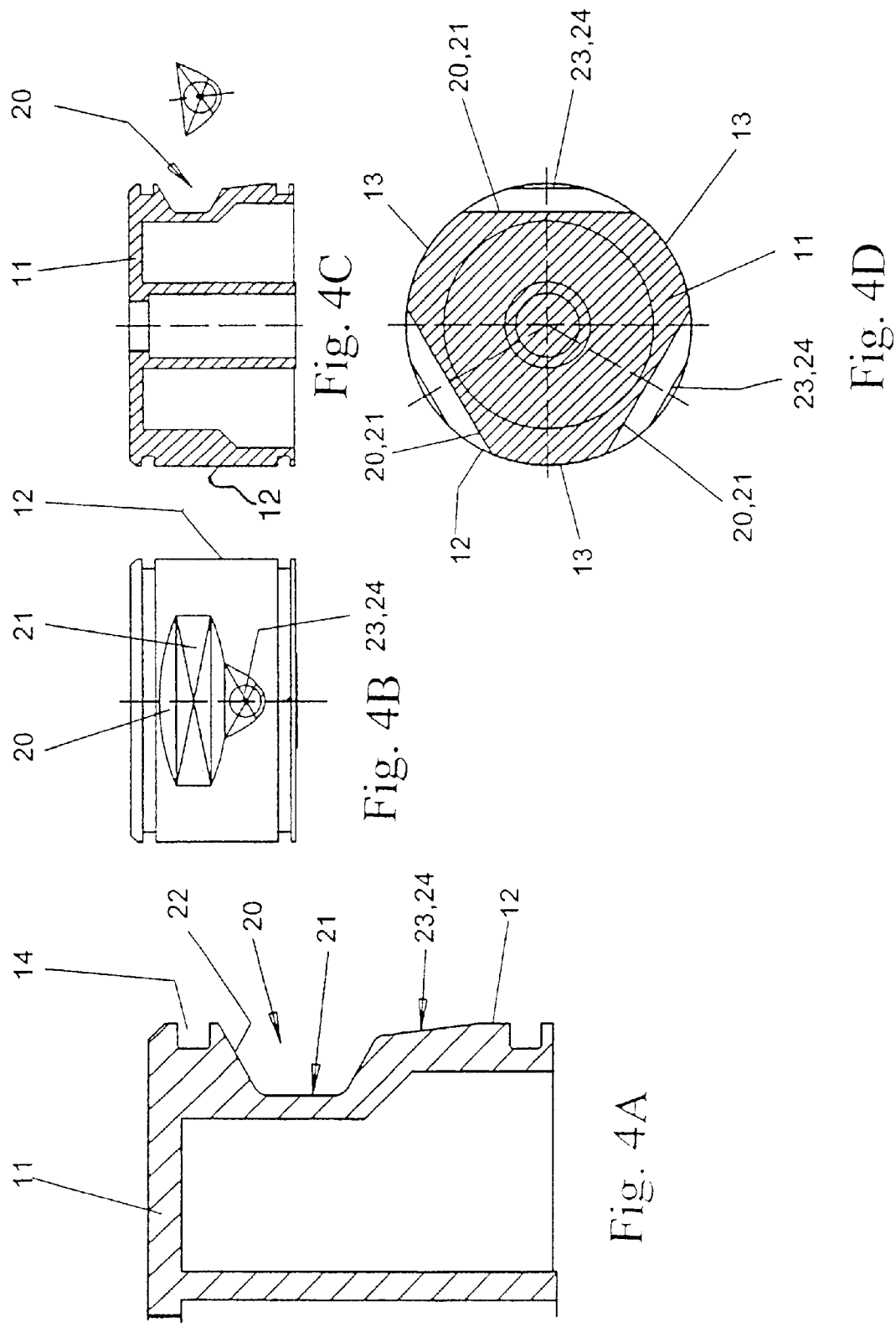

INTERCHANGEABLE COUPLING

FIELD OF THE INVENTION

The present invention pertains to a change coupling or interchangeable coupling for detachably fastening tools on manipulators and more particularly to coupling parts and a positive-locking locking mechanism, wherein the locking mechanism has a plurality of movable locking elements, a piston for actuating the locking elements and corresponding holding openings in the coupling parts.

BACKGROUND OF THE INVENTION

Such a change coupling has been known from DE-A 33 47 423. It comprises two coupling parts, one of which is associated with the manipulator and the other with the tool. The coupling parts are fastened to one another with a positive-locking locking mechanism. This locking mechanism has a plurality of movable locking elements in the form of balls, which are actuated by a conical piston. The piston pushes the balls into a locking position between the two coupling parts. In the retracted position, the piston permits the balls to yield into one cylindrical holding opening, as a result of which the locking connection is released and the two coupling parts can be removed from one another. The other holding opening in the tool-side coupling part is designed as a blind hole of a rounded or conical shape. This design of the holding opening is unfavorable concerning the reliable guiding of and the transmission of forces by the locking balls.

DD-A5 291 505 shows a similar change coupling with an external piston, which is designed as an actuating sleeve. The holding openings have an analogous design and the same problems as in the above-mentioned state of the art.

SUMMARY AND OBJECTS OF THE INVENTION

It is therefore the object of the present invention to provide a better change coupling.

According to the invention, a change coupling or interchangeable coupling is provided for detachably fastening tools to manipulators. The coupling has two coupling parts and a positive-locking locking mechanism. The locking mechanism has a plurality of movable locking elements, a piston for actuating the locking elements and corresponding holding openings in the coupling parts. The holding openings are designed as essentially cylindrical ball channels with an oblique channel axis.

The embodiment of a preferably externally located holding opening as an oblique ball channel offers the advantage that, in conjunction with the locking ball, a better and more reliable locking of the coupling parts is achieved. The forces to be transmitted between the coupling parts are optimally transmitted due to the better-defined contact of the locking elements. An undesired clearance between the coupling parts is avoided. In addition, tolerances and wear are absorbed automatically, and a bevel on the jacket of the piston has a favorable effect due to its clamping function.

Moreover, a cylindrical ball channel has the advantage that linear contact points are obtained, which lead to better guiding and distribution as well as transmission of the clamping forces. The loads and the wear of the locking mechanism are reduced. In addition, the ball channel can be manufactured more easily and accurately than a blind hole. This not only improves the function, but also reduces the manufacturing effort and the cost of the locking mechanism.

The individual distributed recesses on the jacket of the piston offer the advantage that the locking element, especially a ball, can cover greater distances between the locking position and the releasing position. This makes possible a greater coverage and deeper immersion of the ball into the two holding openings in the locking position. The positive locking and the locking are better and withstand higher loads as a result.

The arrangement of the recesses spaced in the circumferential direction offers advantages in terms of the accuracy of the guiding of the piston. Closed jacket surfaces, which offer an accurate guide surface, are left between the recesses.

It is advantageous for centering and guiding the locking elements, especially the balls, to design the recesses as a secant-like flattened area on the cylinder jacket. The locking elements are better guided by the piston as a result, and the tolerances for the rotation position of the piston can also be lower.

Bevels, which exert a tensioning force on the locking elements in the direction of the holding openings during the closing of the locking mechanism, may be arranged under the recesses.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 4A is a partially cut away cross sectional view of a piston;

FIG. 4B is a side view of the piston;

FIG. 4C is a cross sectional view of the piston;

FIG. 4D is another cross sectional view of the piston;

DESCRIPTION OF THE PREFERRED EMBODIMENTS

Figure 1:
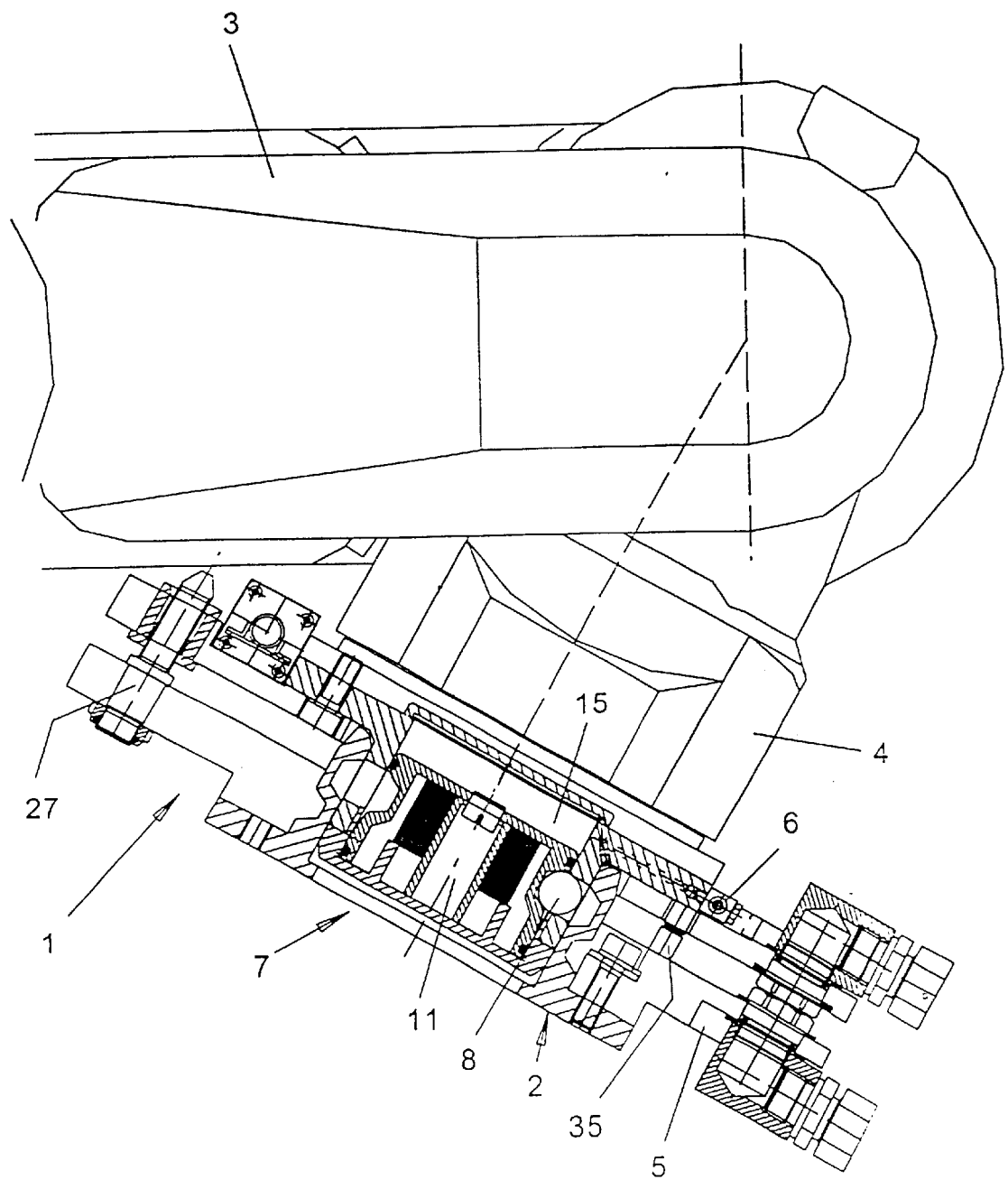
FIG. 1 is a partially cut-away representation of a change coupling on a robot.

Referring to the drawings in particular, FIG. 1 shows a manipulator 3, which is preferably designed as a multiaxial industrial robot and carries on its hand 4 a change coupling or interchange coupling 1 for detachably fastening a tool 2 indicated only symbolically. The change coupling 1 has two coupling parts 5, 6, which are to be connected to one another and of which the coupling part 5 is associated with the tool 2 and the coupling part 6 is associated with the robot 3. A locking mechanism 7 is provided for detachably connecting the coupling parts 5, 6.

With the change coupling 1 closed, the two coupling parts 5, 6 are supported on one another via preferably pin-like positioning contacts 35 in a defined position and at defined locations and are held and clamped by the closed locking mechanism 7 in this position. The positioning contacts 35 act as stops here.

Figure 2:
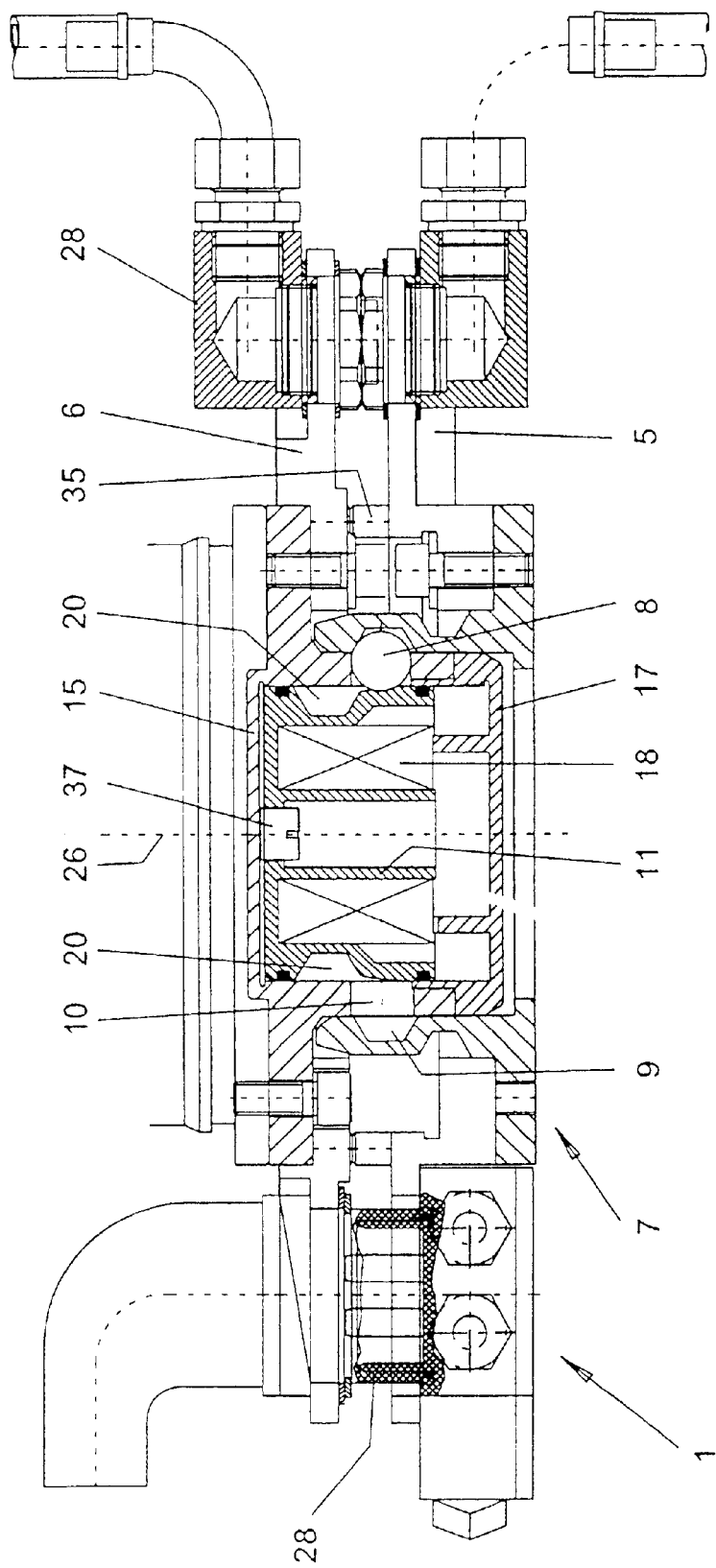
FIG. 2 is the cross sectional view of the change coupling in the locking position.
Figure 3:
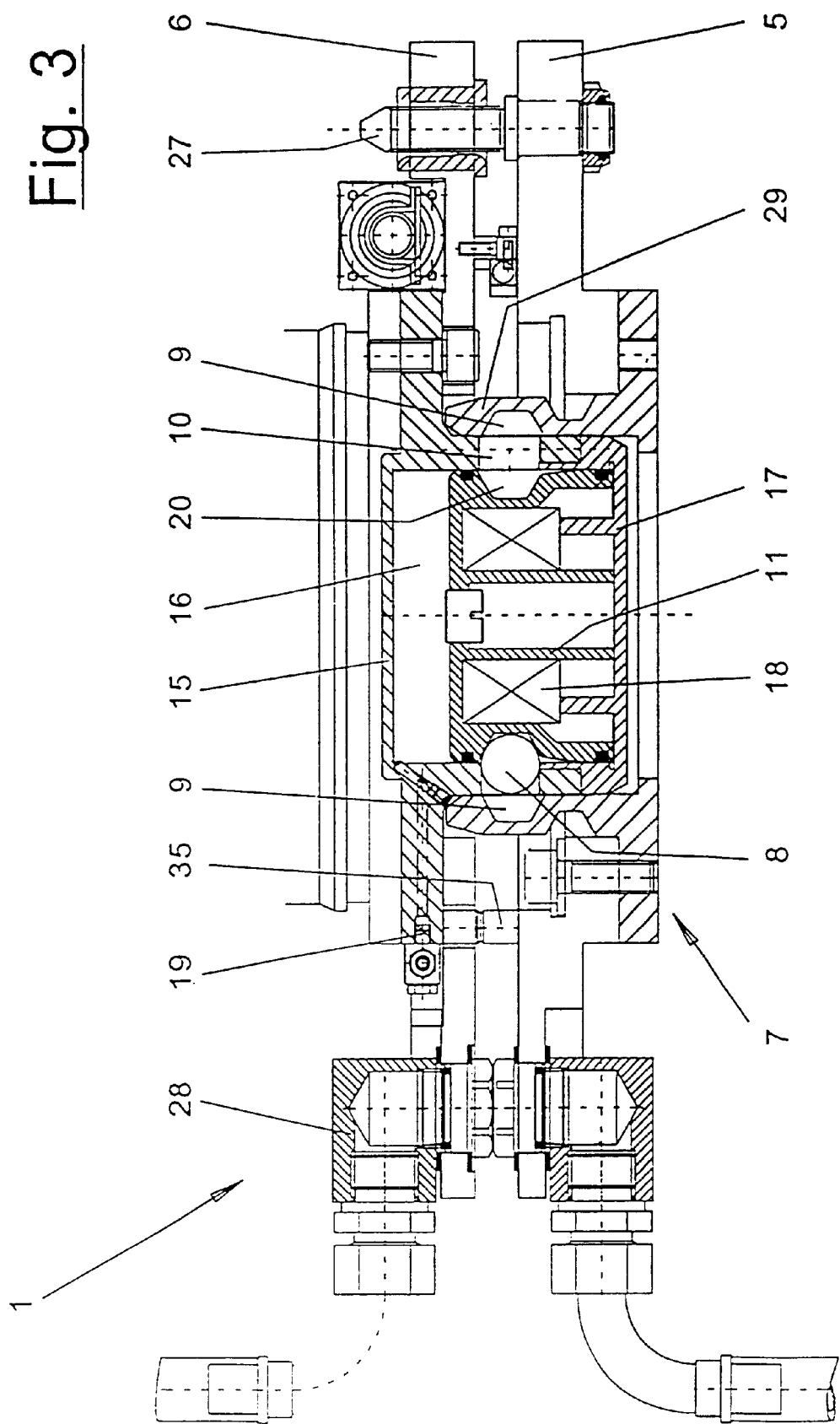
FIG. 3 is the variant of FIG. 2 in the opening position.

The locking mechanism 7 is shown in greater detail in FIGS. 2 and 3, FIG. 2 showing the closing position and FIG. 3 the releasing position. The locking mechanism 7 has a movable piston 11, which is actuated by a pressurizing agent, preferably compressed air, and can move forward and backward along its piston axis 26. Compressed air can preferably be admitted to the piston 11 from both sides. In addition, a spring 18, which holds the piston 11 in the locking position shown in FIG. 2 in case of failure of the supply of pressurizing agent and is an emergency safety means, may be present.

The piston 11 is guided movably at right angles to the separating plane of the coupling parts 5, 6. The cylinder 15 is formed by a ring chamber 16 at the coupling part 6 on the robot side 3. On the opposite tool side 2, an essentially likewise ring-shaped insert 17 is present at the coupling part 6, which said insert cooperates with the ring chamber 16 and forms together with same the cylinder 15 as a closed space of movement for the piston 11.

The piston 11 preferably has a cylindrical shape and is guided with its external jacket 12 in the cylinder 15, which likewise has a circular cross section. Ring seals 14 may be present at the upper and lower edges of the piston. The piston may have hollow spaces on the inside.

The locking mechanism 7 also has a plurality of movable locking elements 8, which are preferably designed as balls and are actuated by the piston 11. The balls 8 are pushed to and fro between two holding openings 9, 10, and they can lock or open depending on the degree of coverage. In the embodiment shown, the tool-side coupling part 5 overlaps the ring channel 16 of the robot-side coupling part 6 on the outside with a ring-shaped flange 29. The ring chamber 16 has a plurality of holding openings 10 in the form of round holes in the chamber wall, in which the balls 8 are guided movably in the transverse direction. The holding openings 10 and the balls 8 have essentially the same diameter. The flange 29 of the tool-side coupling part 5 has corresponding holding openings 9, which are flush with the robot-side holding openings 10 in the coupling position.

On its jacket 12, the piston 11 has a plurality of recesses 20 arranged at spaced locations from one another in the circumferential direction for the locking elements 8. The recesses 20 are arranged at such a level that they are located opposite the holding openings 9, 10 in the releasing position and are located at spaced locations from these in the locking position.

Figures 5A, 5B, 5C, 5D:
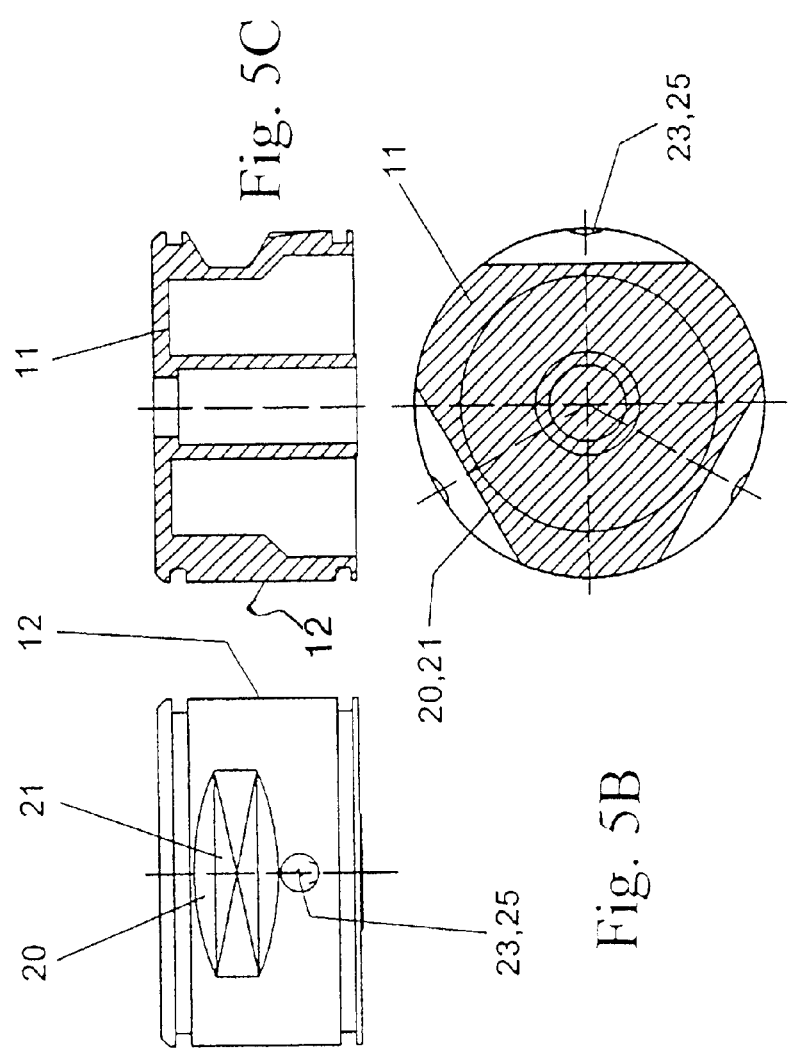
FIG. 5A is a partially cut away cross sectional view of a variant of the piston shown in FIG. 4.
FIG. 5B is a side view of the piston of FIG. 5A.
FIG. 5C is a cross sectional view of the piston of FIG. 5A.
FIG. 5D is another cross sectional view of the piston of FIG. 5A.

As is shown in detail in FIGS. 4 and 5, e.g., three balls 8 and three recesses 20, which are arranged uniformly distributed over the circumference, are present at the piston 11. The guide surfaces 13 mentioned in the introduction, on which the piston 11 is guided in the cylinder 15 over its entire length without interruption with the exception of the seals 14, are left in place between the recesses 20.

The recesses 20 may have various designs. In the preferred exemplary embodiment, they are designed as secant-like flattened areas 21. Due to their flat bottoms, these offer, e.g., as flattened areas 21 prepared by milling, a flat contact surface, which is particularly favorable for the kinematics of the balls during the movement between the locking and releasing positions. As an alternative, the flattened areas 21 may, however, also be in the form of a trough-shaped groove with oblique guide surfaces 22 on the top side and the underside, which guide the balls 8 toward the holding openings 9, 10.

A bevel 23, which is sloping away from the holding openings 9, 10, is located on the jacket 12 under and centrally to the recesses 20. In addition, the bevels 23 extend obliquely toward the recesses 20. Due to their slope, they exert a clamping force directed toward the holding openings 9, 10 on the balls when the ball 11 is moving from the releasing position into the locking position.

FIGS. 4 and 5 show different embodiments of the bevels 23. The bevel 23 is likewise designed as a secant-like flattened area 24 on the round jacket 12. In the variant according to FIG. 5, the bevel 23 has the shape of a vertical groove 25 extending along the piston axis 26.

As an alternative, it may also be a correspondingly sloped, trough-shaped or spherical segment-shaped depression. A certain centering function is obtained for the piston 11 as a result.

FIGS. 2 and 3 show the different positions of the locking mechanism 7. In the locking position according to FIG. 2, the piston 11 has moved upward to the robot-side coupling part 6. As a result, its recesses 20 come to lie in the coupling parts 5, 6 above the holding openings 9, 10. In the locking position, the balls 8 are pressed with the subjacent jacket area and especially the bevels 23 between the two holding openings 9, 10 and are held there. The balls 8 are located approximately half in one tool-side holding opening 9 and half in the other, robot-side holding opening 10. In this position, the coupling parts 5, 6 are mutually locked in a positive-locking manner along the piston axis 26. The piston axis 26 now coincides with the hand axis of the robot 3.

In the releasing position according to FIG. 3, the piston 11 has moved downward and is located with its recesses 20 opposite the holding openings 9, 10. As a result, the balls 8 can become detached from the tool-side holding opening 9 and move through the robot-side holding opening 10 into the recess 20. The coupling parts 5, 6 can be detached from one another in this position.

Figure 6:
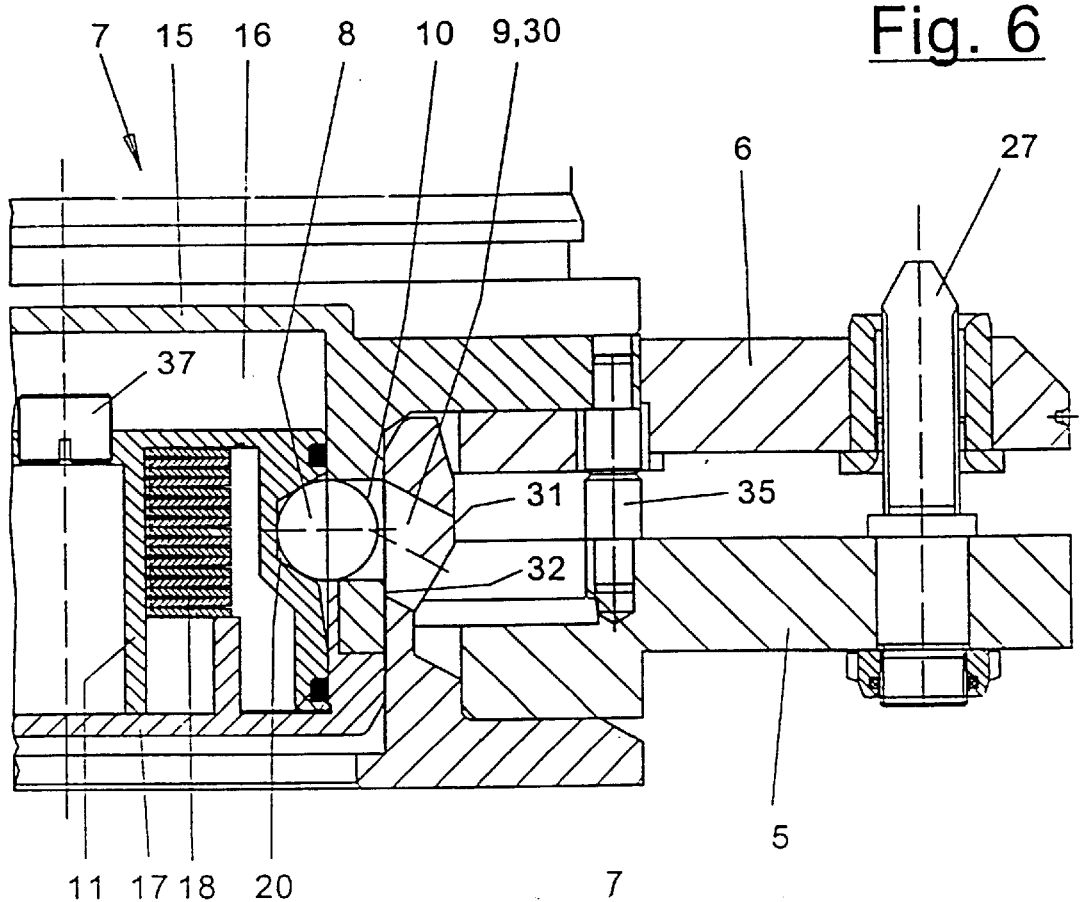
FIG. 6 is a cut-away cross sectional view of the change coupling with a ball channel in the locking position.
Figure 7:
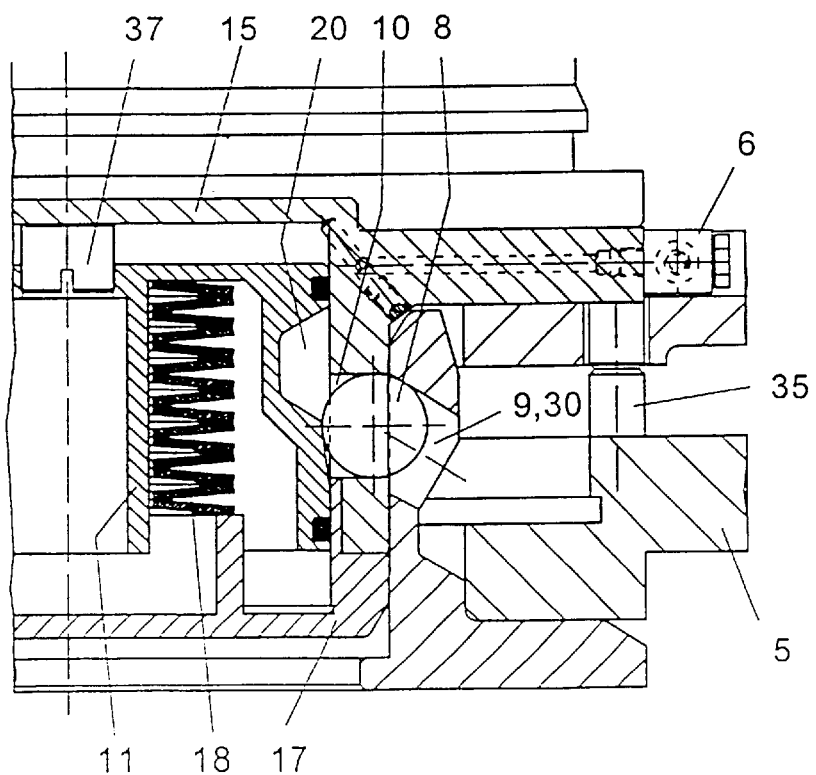
FIG. 7 is a cut-away cross sectional view of the arrangement according to FIG. 6 in the opening position.

FIGS. 6 through 10 show the design of the external holding openings 9 in the flange 29. In the embodiment shown, this flange 29 belongs to the tool-side coupling part 5 and surrounds the ring chamber 16 with the piston 11 on the outside. However, the arrangement of the coupling parts or the outer/inner position of the ring chamber 16 and the flange 29 can be changed over in another embodiment. FIG. 6 shows the change coupling 1 in the locking position. FIG. 7 shows the opening position.

The holding opening 9 is designed as an essentially cylindrical ball channel 30 here, which has an oblique channel axis 31. The channel axis 31 is sloped obliquely to the outside from the robot-side holding opening 10 to the tool side 2. This orientation is shown in FIGS. 6 and 7.

The number of ball channels 30 corresponds to the number of locking elements 8, which are designed as balls here. The ball channels 30 are designed as through holes and are open in the front and rear. At their opening located toward the piston 11 on the inside of the flange 29, they have an elliptical shape due to the angle between the oblique channel axis 31 and the straight front of the flange.

In addition, a set-back step 32 is obtained due to the oblique channel axis 31 and the elliptical shape of the opening at the transition between the ball channel 30 and the robot-side holding opening 10. This step is located in the direction of the tool side 2 under the holding opening 10. On the opposite side, the wall of the holding opening 10, which wall is located at the top, and the upper wall of the ball channel 30 abut against one another more or less flush. Due to this design, the balls 8 can extend into the ball channel 30 by a small amount only in the locking position. However, they cannot fall out of the ball channel 30.

The holding opening 10 and the ball channel 30 have essentially the same diameter as the locking balls 8. The differences in diameter are just great enough for the locking ball 8 to be able to move in the openings 9, 10, 30.

Figure 8:
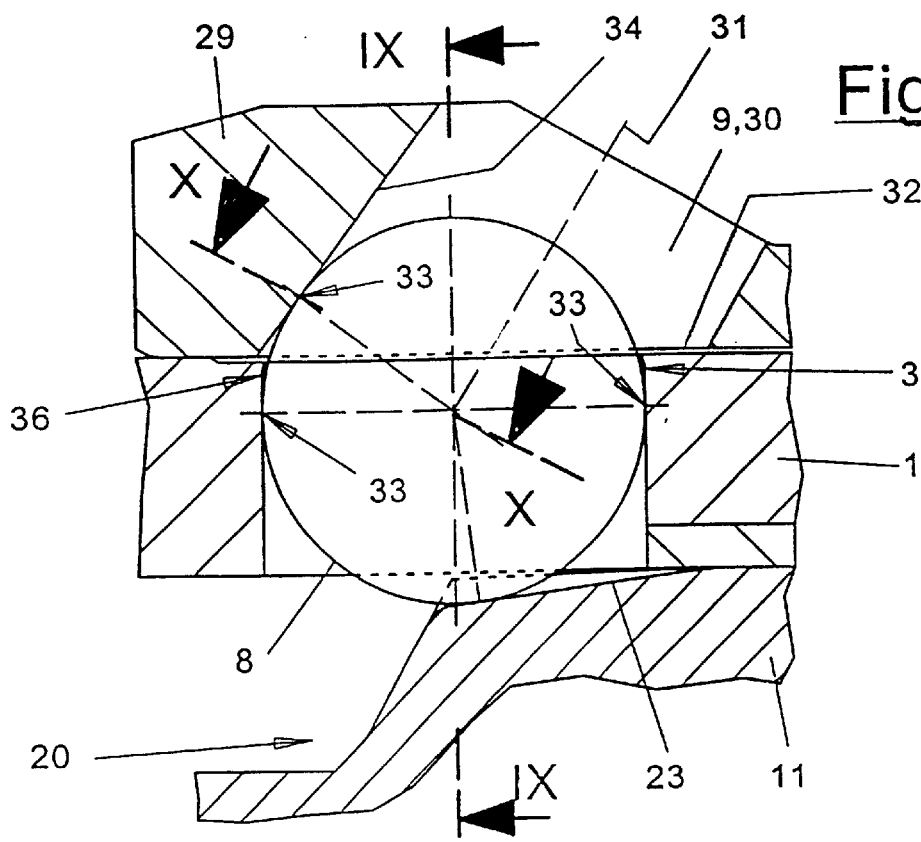
FIG. 8 is an enlarged detail view of the ball at the ball channel in the locking position.
Figure 9:
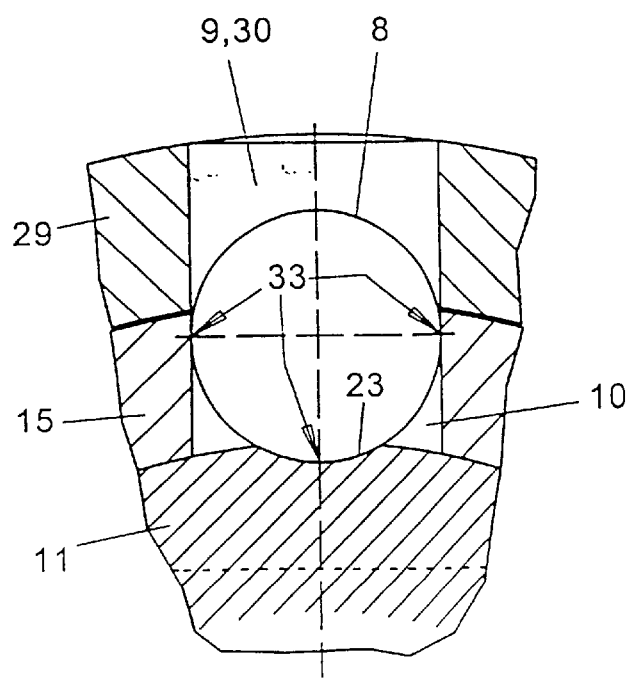
FIG. 9 is a cross sectional view of FIG. 8 corresponding to the section line IX—IX.
Figure 10:
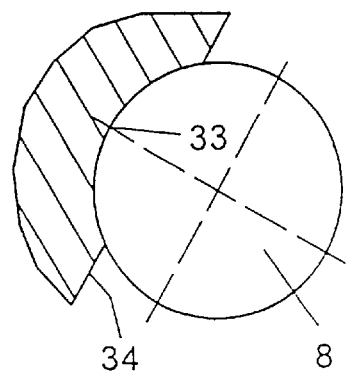
FIG. 10 is a cross sectional view of FIG. 8 corresponding to the section line X—X.

As is shown in FIG. 8, the locking ball 8 is in contact with the ball channel 30, the holding opening 10 and the piston 11 with three distributed contact points 33 in the locking position of the change coupling 1. FIGS. 9 and 10 show this constellation in sectional views along the section lines IX—IX and X—X in FIG. 8.

Due to its oblique position, the ball channel 30 presses the locking ball 8 with its channel wall 34 pointing toward the robot side 3 and presses same specifically against the opposite lower wall of the holding opening 10 and against the piston 11 or its bevel 23 with an oblique force component. There is a linear contact at the contact points 33.

Due to the linear contact, the ball 8 is clamped at the three contact points 33 arranged in a distributed pattern and exactly guided in the locking position. The clamping and locking forces of the change coupling 1 are exactly transmitted as a result. Due to the step 32, the ball 8 has contact in the ball channel 30 only with the upper channel wall 34 and does not come into contact with the opposite, lower channel wall. The forces introduced via the tool 2 are transmitted as a result via the ball 8 directly to the lower contact point 33 and to the holding opening 10 on the robot-side coupling part 6. A clearance is extensively prevented from occurring. The bevel 23 on the piston 11 clamps this position of the ball with the contact points 33 and absorbs possible tolerances or wear on the components involved. Due to the linear contact in the contact points 33, uniform loading and improved guiding of the components involved are guaranteed.

The locking elements 8 are held in the holding opening 10 by a suitable fall-out protection means 36. This comprises, e.g., one or more securing bosses at the edge of the opening located adjacent to the holding opening 9. The inwardly bent securing bosses narrow the mouth of the opening and hold back the locking elements 8. This design is shown in FIG. 8.

Centering pins 27 for locating and maintaining the correct rotation position during coupling may be arranged on the coupling parts 5, 6. The position of the piston and the pretension of the springs 18 are set by means of adjusting screws 37 on the bottom of the piston. In addition, one or more rotary connections for transmitting electricity, compressed air, cooling fluid, hydraulic oil, etc., from the robot 3 to the tool 2 may be present. In addition, the coupling parts 5, 6 may have suitable stops, spacers, etc.

Various modifications of the embodiment shown are possible. An outside, sleeve-shaped piston may be present instead of the internally guided piston 11. As an alternative, actuation by means of pressurizing agent may take place on one side only. The assignment of the flange 29 and the ring chamber 16 may be changed over, in which case the flange 29 comes to lie on the inside. The design, assignment and function of the holding openings 9, 10 and the ball channel 30 are also correspondingly adapted in this case.

The shape of the recesses 20 and of the bevels 23 is also variable. Moreover, other suitable locking elements may be used instead of balls. Furthermore, the piston and cylinder may have a shape other than cylindrical. The number and the arrangement of the locking elements 8 may vary as well, and they do not have to be at the same level.

While specific embodiments of the invention have been shown and described in detail to illustrate the application of the principles of the invention, it will be understood that the invention may be embodied otherwise without departing from such principles.

What is claimed is:

1. A manipulator changeable coupling for detachably fastening tools, the coupling comprising:
   a first coupling part having holding openings comprising at least three cylindrical ball channels;
   a second coupling part having holding openings comprising three cylindrical ball channels, each channel having an oblique angle channel axis;
   a positive-lock locking mechanism including a cylinder connected to said first coupling part and having said three first part cylindrical ball channels spaced apart uniformly, a pneumatic source, a cylindrical pneumatic piston movable in said cylinder by connection to said pneumatic source between a locked position and a non-locked position, at least three locking balls, each ball being disposed in a respective first coupling part cylindrical ball channel, said piston acting on each ball in said locked position to maintain each ball at least partially in a respective first part cylindrical ball channel and an associated cylindrical ball channel with oblique angle channel axis of said second coupling part and a spring for acting on the piston to bias the piston toward said locked position; and
   positioning contacts for mutually supporting the first coupling part and the second coupling part, said positioning contacts being arranged outside the locking mechanism at a spaced location form a central axis of said piston.

2. A coupling in accordance with claim 1, wherein said second coupling part is a tool side coupling part and said first coupling part is a manipulator coupling part with each opening including said channel axis, which is sloped from manipulator side toward a tool side.

3. A coupling in accordance with claim 1, wherein a set-back step is formed between said cylindrical ball channels of the cylinder and said cylindrical ball channels of the second coupling part.

4. A coupling in accordance with claim 1, wherein said second coupling part is a tool side coupling part and said first coupling part is a manipulator coupling part with a diameter of the manipulator side holding openings and a diameter of the tool side holding opening and a diameter of said locking balls being essentially equal.

5. A coupling in accordance with claim 1, wherein said piston has a plurality of recesses arranged at mutually spaced locations from one another on a piston jacket, said recesses for receiving corresponding ones of said locking elements.

6. A coupling in accordance with claim 5, wherein said recesses include substantially flattened areas.

7. A coupling in accordance with claim 5, wherein three of said recesses are arranged substantially uniformly distributed in about the outside of said piston.

8. A coupling in accordance with claim 5, wherein a bevel sloping away from said holding openings is arranged adjacent to each respective one of said recesses.

9. A coupling in accordance with claim 8, wherein said bevel has a flattened area.

10. A coupling in accordance with claim 8, wherein said bevel is a groove.

11. A coupling in accordance with claim 8, wherein said bevel is a spherical segment depression.

12. A robot changeable coupling for detachably fastening tools, the coupling comprising:
   a first coupling part with a connected cylinder having three cylindrical ball channels spaced apart uniformly;
   a second coupling part having a portion surrounding a portion of said cylinder and having three cylindrical ball channels spaced apart uniformly corresponding to said first coupling part channels, each channel having an oblique angle channel axis;
   a pneumatic source;
   a cylindrical pneumatic piston movable in said cylinder by connection to said pneumatic source between a locked position and a non-locked position;
   three locking balls, each ball being disposed in a respective first coupling part cylindrical ball channel, said piston acting on each ball in said locked position to maintain each ball at least partially in a respective first part cylindrical ball channel and an associated cylindrical ball channel with oblique angle channel axis of said second coupling part; and
   positioning contacts for mutually supporting the first coupling part and the second coupling part, said positioning contacts being arranged outside the locking mechanism at a spaced location form a central axis of said piston.

13. A coupling in accordance with claim 12, wherein said first coupling part is a robot side coupling part and said second coupling part is a tool side holding coupling part, said tool side cylindrical ball channels each having said channel axis sloped from said robot side holding opening toward a tool side.

14. A coupling in accordance with claim 12, wherein said piston has a plurality of recesses arranged at mutually spaced locations from one another on a piston jacket, said recesses for receiving corresponding ones of said balls.

15. A coupling in accordance with claim 14, wherein three said recesses are arranged substantially uniformly distributed about the outside of said piston.

16. A coupling in accordance with claim 14, wherein a bevel sloping away from said holding openings is arranged adjacent to each of said recesses respectively.

17. A coupling in accordance with claim 16, wherein said bevel is a groove.

18. A manipulator changeable coupling for detachably fastening tools, the coupling comprising:
   a first coupling part having holding openings comprising at least three cylindrical ball channels;
   a second coupling part having holding openings comprising three cylindrical ball channels, each channel having an oblique angle channel axis;
   a positive-lock locking mechanism including a cylinder connected to said first coupling part and having said three first part cylindrical ball channels spaced apart uniformly, a pneumatic source, a cylindrical pneumatic piston movable in said cylinder by connection to said pneumatic source between a locked position and a non-locked position, at least three locking balls, each ball being disposed in a respective first coupling part cylindrical ball channel, said piston having a plurality of recesses arranged at mutually spaced locations from one another on a piston jacket, said recesses for receiving corresponding ones of said balls, said recesses including substantially flattened areas, said piston acting on each ball in said locked position to maintain each ball at least partially in a respective first part cylindrical ball channel and an associated cylindrical ball channel with oblique angle channel axis of said second coupling part and a spring for acting on the piston to bias the piston toward said locked position; and
   positioning contacts for mutually supporting the first coupling part and the second coupling part, said positioning contacts being arranged outside the locking mechanism at a spaced location form a central axis of said piston.

* * * * *